United States Patent
West et al.

(10) Patent No.: US 6,449,722 B1
(45) Date of Patent: Sep. 10, 2002

(54) SYSTEM AND METHOD FOR MAINTAINING A VIRTUAL CONNECTION TO A NETWORK NODE

(75) Inventors: Terry D. West; David G. England, both of Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/112,071

(22) Filed: Jul. 8, 1998

(51) Int. Cl.[7] ................................................ G06F 11/30
(52) U.S. Cl. ...................................... 713/200; 455/426
(58) Field of Search ............................ 380/23, 49, 247, 380/248, 249, 270; 713/200, 201, 202, 168, 169, 170; 455/434, 435, 556, 455, 551, 426, 552; 370/331

(56) References Cited

U.S. PATENT DOCUMENTS

| | | | | |
|---|---|---|---|---|
| 5,392,452 A | * | 2/1995 | Davis ........................ | 455/38.1 |
| 5,488,649 A | | 1/1996 | Schellinger et al. | |
| 5,561,845 A | | 10/1996 | Bendixen et al. | |
| 5,668,875 A | * | 9/1997 | Brown et al. ................... | 380/23 |
| 5,732,074 A | * | 3/1998 | Spaur et al. ................. | 370/313 |
| 5,784,693 A | * | 7/1998 | Barber et al. ............... | 455/434 |
| 5,809,395 A | * | 9/1998 | Hamilton-Piercy et al. .. | 455/4.1 |
| 5,894,478 A | * | 4/1999 | Barzegar et al. ............ | 370/401 |
| 5,926,760 A | | 7/1999 | Khan et al. | |
| 6,088,450 A | * | 7/2000 | Davis et al. ................. | 713/182 |
| 6,229,792 B1 | * | 5/2001 | Anderson et al. ........... | 370/280 |

OTHER PUBLICATIONS

W. Richard Stevens, TCP/IP Illustrated, vol. 1, The Protocols, pp. 419–439, 1994.*

* cited by examiner

Primary Examiner—Gail Hayes
Assistant Examiner—Ho S. Song
(74) Attorney, Agent, or Firm—Blakely, Sokoloff, Taylor & Zafman LLP

(57) ABSTRACT

A wireless device is provided with a plurality of connectivity options that enable it to connect to a carrier via alternative connectivity routes thereby providing access to value-added services and other information over plurality of connectivity routes. A user of the wireless device may select alternative connectivities when available based on dollar expense, available bandwidth, reliability, latency, or other considerations. Volume data delivery may be deferred until a more suitable connectivity route is established. With each change of connectivity the wireless device should reauthenticate itself. Reauthentication can be simplified by employing the previously authenticated route and leveraging the original authentication.

13 Claims, 3 Drawing Sheets

SYSTEM AND METHOD FOR MAINTAINING A VIRTUAL CONNECTION TO A NETWORK NODE

BACKGROUND OF THE INVENTION

(1) Field of the Invention

The invention relates to connectivity in a wireless network. More specifically, the invention relates to providing alternative connectivities and improved authentication between a carrier and a wireless device.

(2) Background

Wireless devices such as laptop computers, two-way pagers, palm PCs, personal digital assistants (PDAs), etc. have proliferated in recent years. Typically, these devices establish connectivity via a radio tower having an associated base station which communicates with a carrier. The carrier typically has a plurality of base stations associated therewith. Each base station covers a different though possibly overlapping segment of the carrier's coverage area. A wireless device is generally connected to no more than one base station at any time. The particular base station to be used is usually selected based on signal strength. When the signal strength from a different base station exceeds the signal strength of the base station through which the wireless device is currently communicating, a hand-off is performed and the new base station takes over providing a link to the carrier.

While the carrier itself may provide some information to the wireless device directly, often it is not the end of the communication pipe but rather acts as a proxy for the wireless device to gain access to other data available over other networks. The carrier is expected to have a reliable connection to such data and in turn funnels it to the wireless device. The carrier also may provide security and protocol conversion functions desirable in the wireless environment. The carrier may also maintain a record of user preferences, display options, etc., such that data presented via the carrier arrives consistent with those preferences.

When connectivity is initially established, it is necessary for the wireless device to authenticate itself to the carrier. It can take minutes to complete the authentication process, the more extensive and secure the authentication process, the longer it usually takes. Once authenticated, the carrier may provide access to the Internet, a corporate server, or any number of other value-added services. The proliferation of wireless devices has similarly caused a proliferation in available value-added services. Unfortunately, such value-added services typically cease to be available to the wireless device when the wireless device is outside the coverage area of the carrier. Often, when a user is outside of the coverage area of their carrier, no option exists for obtaining access to the value-added services available within the coverage area at any cost.

Moreover, existing systems do not permit, for example, a user to access from their desktop PC the value-added services available through their wireless device. Thus, to obtain access to the value-added services, the wireless device continues to communicate via the base station to the carrier over the bandwidth constrained and relatively expensive wireless connectivity.

In view of the foregoing, it would be desirable to have an improved method and system which provides improved access to the carrier's value-added services. It would further be desirable to reduce the cost of authentication.

BRIEF SUMMARY OF THE INVENTION

A method and system for maintaining connectivity to a network node is disclosed. A wireless device is provided having a plurality of connectivity options. A carrier interfaces between the wireless device and information desired by the wireless device. The wireless device may carry on wireless communication with the carrier through a base station. When the wireless device communicates with the carrier through an alternative connectivity, a virtual base station controller interfaces between the carrier and wireless device.

DETAILED DESCRIPTION OF THE INVENTION

A wireless device is provided with a plurality of connectivity options that enable it to connect to a carrier via alternative connectivity routes thereby providing access to value-added services and other information over a plurality of connectivity routes. A user of the wireless device may select alternative connectivities when available based on dollar expense, available bandwidth, reliability, latency, or other considerations. Volume data delivery may be deferred until a more suitable connectivity route is established. With each change of connectivity the wireless device should reauthenticate itself. Reauthentication can be simplified by employing the previously authenticated route and leveraging the original authentication.

Figure 1:
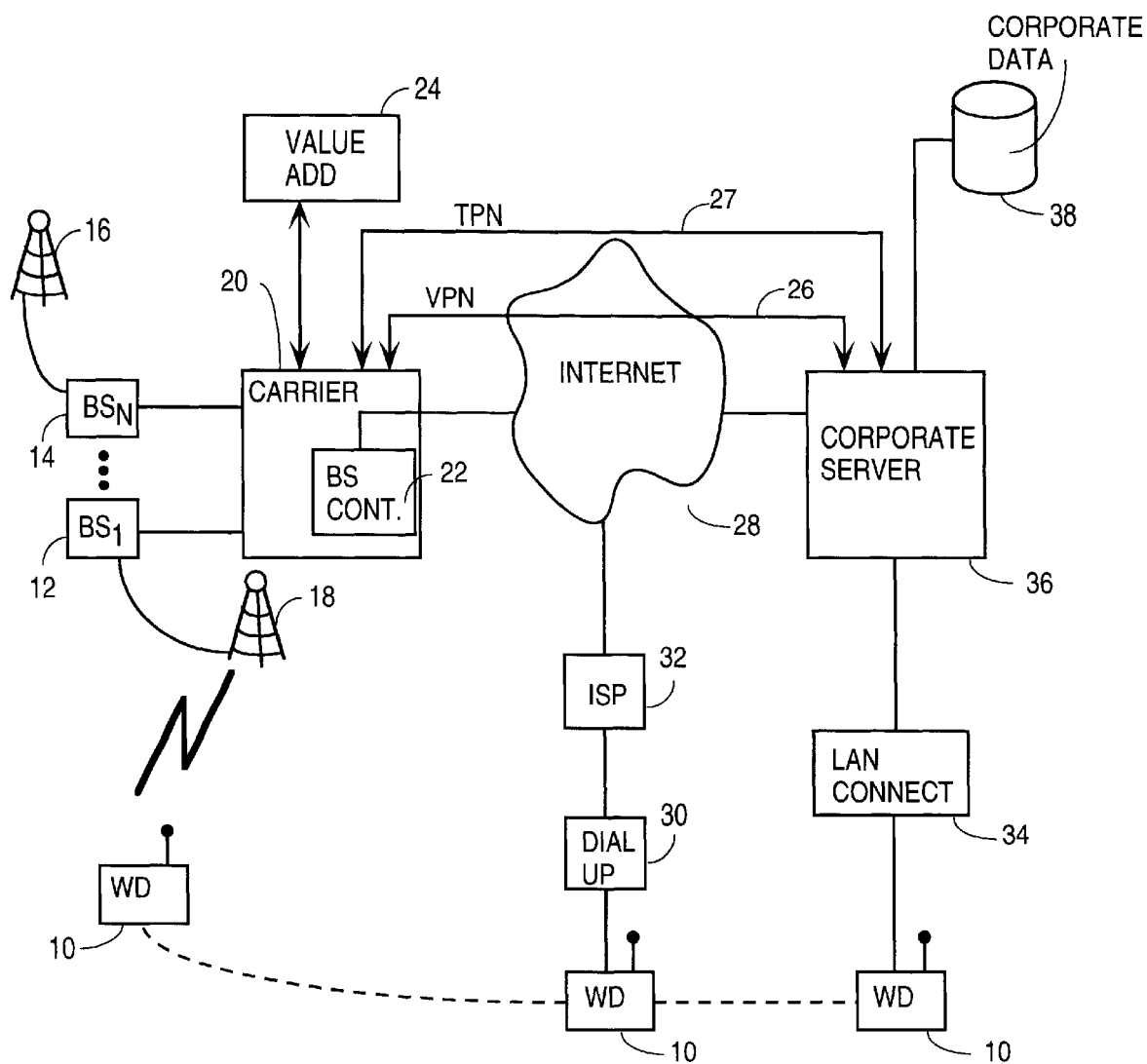
FIG. 1 is a block diagram of a system of one embodiment of the invention.

FIG. 1 is a block diagram of a system of one embodiment of the invention. A carrier 20 is coupled to a plurality of base stations ($BS_1$–$BS_N$ where N may be an arbitrarily large number). Each base station is coupled to a transceiver tower. $BS_1$ 12 is coupled to transceiver tower 18, while $BS_N$ 14 is coupled to transceiver tower 16. A wireless device 10 may communicate via a transceiver tower 18 through base station 12 through carrier 20 to access value added services and other information. Typically, wireless device 10 sends network packets over the airwaves using a network specific protocol to the transceiver tower 18 which then forwards the packets along to base station 12 and then to carrier 20. Carrier 20 reformats the request in the network packet to be compatible with a network through which the information and value added services can be reached.

In this way, carrier 20 may provide value-added services 24 and provide those in the opposite direction via base station 12 through transceiver tower 18 to wireless device 10. In some situations value added services 24 may initiate contact with wireless device 10 through carrier 20. Additionally, a virtual private network (VPN) 26 or a true private network (TPN) 27 may exist between the carrier 20 and corporate server 36, which has access to corporate data 38. The carrier may also access the corporate server or other information over a wide-area network (WAN), such as the Internet 28.

In one embodiment of the invention, in addition to the wireless connectivity just described, wireless device 10 is capable of one or more alternative connectivities. This enables wireless device 10 to communicate with the carrier 20 by a lower cost connectivity route when available or permit connectivity where not otherwise in coverage. In this case, cost may be defined in terms of dollar expense, bandwidth, latency, reliability, etc. For example, wireless device 10 may connect through dial-up unit 30 to Internet Service Provider (ISP) 32 and access the carrier through the Internet 28. However, since the carrier 20 is only accustomed to communicating directly with the wireless device via the carrier's physical base stations 12, 14, a virtual base station controller 22 is provided to interface between the carrier 20 and the wireless device 10 when the wireless device 10 connects via an alternative connectivity.

In one embodiment, the wireless device 10 tunnels network packets inside, e.g., Transmission Control Protocol/Internet Protocol (TCP/IP) packets, via dial-up unit 30 through an Internet Service Provider (ISP) 32 over the Internet 28 to virtual base station controller 22. Virtual base station controller 22 then detunnels the network packet and provides it to the carrier 20. Significantly, the virtual base station controller can be built as a "bolt-on" unit, thereby minimizing the amount of architecture reworking required to handle legacy concerns. It is expected that while remaining logically distinct, the virtual base station controller will over time migrate into the carrier, that embodiment being within the scope of virtual base station controller as used herein.

Alternatively, the wireless device 10 may be connected via a local area network (LAN) connect 34 which might be a docking station on the desktop or any other connection to the LAN. Again, network packets may be tunneled by the LAN connection over the corporate server through the Internet 28 using VPN 26 or via TPN 27 to virtual base station controller 22. Virtual base station controller 22 then detunnels the network packets and provides the packet to the carrier as though it had received it from a physical base station. Even when connecting over the LAN, the wireless device may be unable to access the corporate server directly. For example, if the corporate server is a Microsoft Windows NT server available from Microsoft Corporation of Redmond, Washington, it may require NT authentication that the wireless device cannot perform. The wireless device may still go through the carrier which can perform NT authentication on behalf of the wireless device.

When the wireless device 10 connects to an alternative connectivity, if the device is still in a coverage area of a physical base station, the carrier should be notified of the hand-off to the new connectivity. In this instance, the point of connection, be it dial-up unit 30 or LAN connect 34, becomes a virtual base station. A hand-off between physical base stations is based on signal strength. Thus, if wireless device 10 moves from where the signal strength from tower 16 is less than the signal strength from tower 18, a hand-off from $BS_N$ 14 to $BS_1$ 12 will be initiated. Similarly, when a wireless device connects up via an alternative connectivity route, virtual base station controller 22 should initiate a hand-off from the wireless connectivity. This may be done by indicating to the carrier that the signal strength over the alternative connectivity route is very strong.

The virtual base station controller 22 is responsible for registering and maintaining a unique association with a virtual base station to which the wireless device is connected. It ensures that data from the carrier are properly routed back to the appropriate virtual base station. The virtual base station controller 22 maintains an association of a unique number such as a manufacturers serial number (MSN), an electronic serial number (ESN), or personal identification number (PIN) and an internet protocol address. The rest of the carrier's network is advised of the unique number but does not care about the address. The virtual base station controller 22 may ensure proper routing by monitoring all transactions on the carrier and claiming those directed to its virtual base stations, or the carrier could be required to target the virtual base stations explicitly. In this manner, from the carrier's perspective, when the wireless device communicates through an alternative connectivity route, it merely appears as though its device roamed to different base stations.

Figure 2:
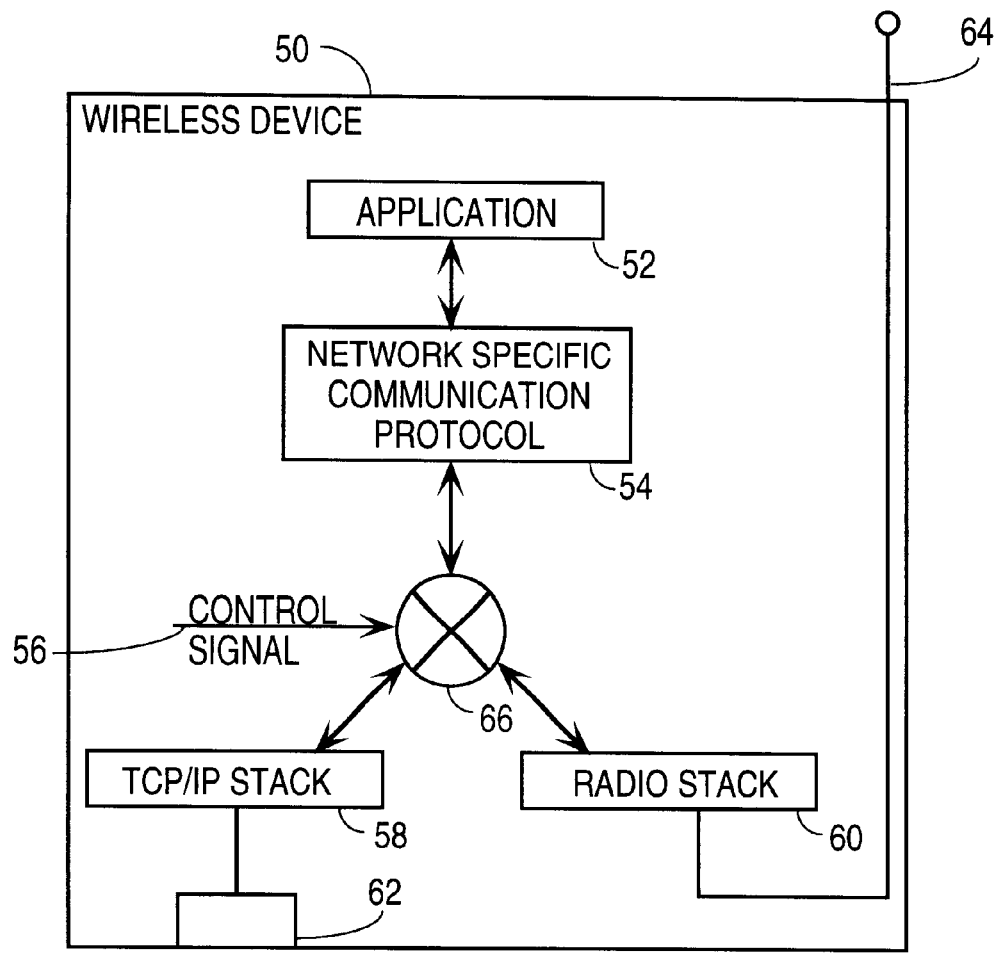
FIG. 2 is a block diagram of a wireless device of one embodiment of the invention.

FIG. 2 shows a wireless device of one embodiment of the invention. Wireless device 50 contains an application 52 which may, for example, be an e-mail program or any other application suitable for operation on a wireless device. Application 52 sends data to and receives data from a network specific protocol layer 54. Network specific protocol layer 54 arranges, formats, and sequences according to a network type implementing and/or carrier convention, then passes this data to router 66. Router 66 routes the data and protocol information to a stack corresponding to a connectivity in use based on control signal 56. For example, as shown, the data and protocol information may be forwarded to a radio stack 60 and out over antenna 64 or alternatively, to TCP/IP stack 58 which will tunnel the data and network protocol information within the TCP/IP packet and send it out over port 62 via, for example, a telephone link. Control signal 56 may be generated by combinational logic (not shown) which detects connection to alternate connectivities. While two possible connectivities are shown, it is contemplated that multiple connectivities are possible, including without limitation, satellite uplink connectivity, LAN connectivity, dial-up connectivity, and normal wireless connectivity. It is also within the scope and contemplation of the invention for the wireless device to provide different protocol packets for each of its connectivities, rather than tunneling network packets within the protocol of the particular connectivity employed.

Figure 3:
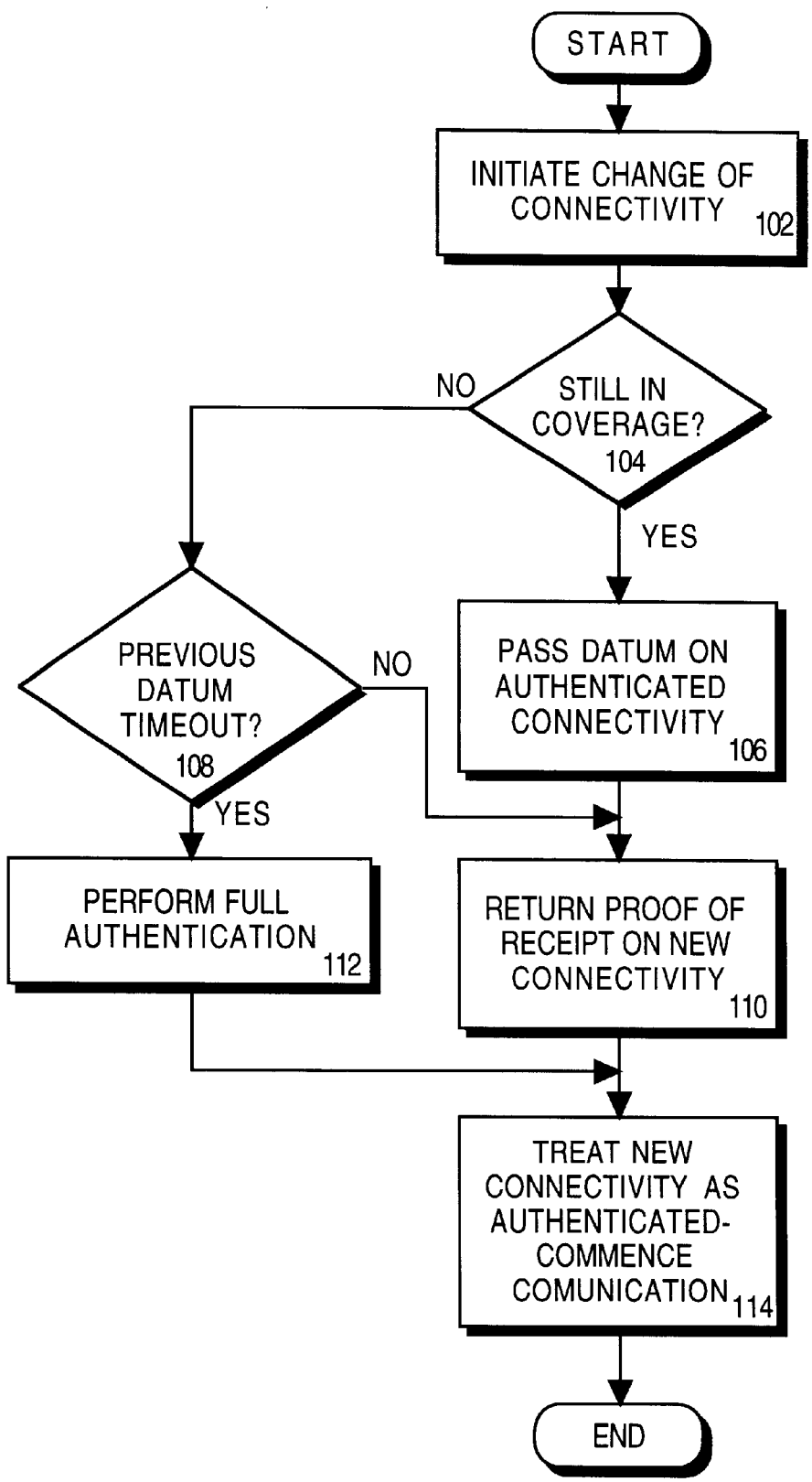
FIG. 3 is a flow chart of an authentication routine of one embodiment of the invention.

Each time the wireless device changes its connectivity route, some level of reauthentication is required. This authentication helps to ensure that no fraudulent carrier has inserted itself into the conversation and that access over the alternative connectivity is permitted. Because full authentication procedures may require significant costs in terms of: i) connection time, often taking minutes to complete, ii) processing power representing a nontrivial battery drain, and (iii) possibly dollar expense, one embodiment of the invention employs an improved authentication method in switching between connectivities. FIG. 3 is a flow chart of an authentication routine of one embodiment of the invention. At functional block 102, a change of connectivity is initiated. The change may be moving from wireless connectivity to dial-up or any other form of connectivity supported by the wireless device, or the change could be from one of the other connectivities back to the wireless connectivity. A determination is made at decision block 104 whether the device is still in coverage with the previous connectivity. If the device is still in coverage, a datum is passed on the authenticated connectivity at functional block 106. If the device is not still in coverage, a determination is made if a previous datum passed to the wireless device has timed out at decision block 108. If the datum has not timed out or if real-time datum passage is possible, the wireless device then returns proof of receipt of the datum on the new connectivity at functional block 110. For example, the datum might be a secret randomly generated key. Then proof of receipt of the datum might be a one-way hash of the key or merely the key itself. If at decision block 108, the previous datum has timed out, the wireless device must perform full authentication before being granted access to the carrier. After full authentication or after return of proof of receipt at functional block. 110, the new connectivity is treated as authenticated and communication may be commenced. at functional block 114.

In one embodiment of the invention, the carrier periodically passes new keys over a fully authenticated connection to a connected wireless device. The key is deemed to be valid for a period of time. The period during which the key is valid may be assigned different priority levels such that the age of the key may restrict the quality of the authentication. For example, it may be determined. that a key five minutes or less old entitles its holder to full access to the services of the carrier. A key from five to fifteen minutes old may entitle the holder to access to some level of lower priority carrier documents, and a key over fifteen minutes old may be timed out, and therefore invalid, not providing access to the carrier at all. There may, of course, be multiple levels of priority and the time frames for validity of keys may be varied as a design choice.

If the protocol requires simultaneous connection for real time reauthentication over the new route, when going from wired connection to wireless, some transition routine is used to signal that disconnection is about to occur. This allows the necessary key exchange to take place rather than merely pulling the plug and losing the authenticated connection. In this routine, the virtual base station controller may, for example, indicate to the carrier that its signal strength is deteriorating while passing the authentication datum. A physical base station with the strongest signal strength will then establish a connection. Proof of receipt of the authentication datum can be passed to the carrier over the new connection. The new route is thereby authenticated. If keys are intermittently passed to the wireless device and have a non-trivial valid period then explicit signaling in advance of disconnection may be avoided.

In an alternate embodiment of the invention, the carrier passes the datum on a new connectivity and proof of receipt is provided on the previously authenticated connectivity. Because interaction on the authenticated connectivity is still required for further communication on the new connectivity, the reliability on the authentication processed is maintained.

While most existing carriers do not support an ongoing connection over multiples connectivities, another alternate embodiment of the invention maintains connections over more than one connectivity when more than one connectivity is simultaneously supported by the carrier.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A system comprising:
   a wireless device having a plurality of connectivity options;
   a carrier that provides an interface between the wireless device and desired information;
   a base station through which the wireless device may establish wireless communication with the carrier; and
   a virtual base station controller interfacing between the carrier and the wireless device when an alternative connectivity is employed, such that whether the wireless device interfaces via the virtual base station controller or establishes wireless communication through the base station is transparent to the carrier.

2. The system of claim 1 wherein the wireless device tunnels a network packet over the alternative connectivity.

3. The system of claim 2 wherein the virtual base station controller detunnels the network packet and presents the network packet to the carrier and wherein the virtual base station controller maintains a record of a source of the network packet.

4. The system of claim 3 wherein the network packets are tunneled in TCP/IP packets.

5. The system of claim 4 wherein the TCP/IP packets are secured using virtual private network techniques.

6. The system of claim 1 wherein when the wireless device establishes a new connectivity, authentication is performed using a previously authenticated connectivity.

7. A method comprising:
   establishing a new connection route to a carrier from a wireless device;
   receiving a datum from the carrier over one of a previously authenticated connection route and the new connection route; and
   sending proof of receipt of the datum to the carrier over the one of the new connection route and the previously authenticated connection route on which the datum was not received.

8. The method of claim 7 further comprising:
   tunneling network packets to the carrier from the wireless device over the new connection route.

9. The method of claim 7 wherein the wireless device maintains connection to both the new connection route and the previously authenticated connection route until authentication of the new connection route is complete.

10. The method of claim 7 wherein the datum is received after the new connection route is requested.

11. A method comprising:
    periodically forwarding an authentication datum to a wireless device over an authenticated connectivity;
    receiving a proof of receipt of the authentication datum after the wireless device changes to a new connectivity; and
    treating the new connectivity as authenticated once the proof of receipt is received.

12. The method of claim 11 further comprising:
    establishing a time limit during which the authentication datum is valid.

13. The method of claim 12 wherein the time limit may vary depending on an information requested.

* * * * *